United States Patent
Goldfarb et al.

(10) Patent No.: US 11,337,054 B2
(45) Date of Patent: *May 17, 2022

(54) SYSTEM AND METHOD FOR OBTAINING AN IDENTIFIER OF A MOBILE COMMUNICATION TERMINAL AT A CONTROL CHECKPOINT

(71) Applicant: Verint Systems Ltd., Herzliya Pituach (IL)

(72) Inventors: Eithan Goldfarb, Ness Ziona (IL); Doron Breiter, Palodia Limassol (CY); Constantin Tanasa, Kapsalos Limassol (CY); Victor Ciochina, Jud. Galati (RO); Nguyen Hoang Nguyen, Quang Nam (VN); Tymofii Brezhniev, Severodonetsk (UA)

(73) Assignee: COGNYIE TECHNOLOGIES ISRAEL LTD., Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/990,479

(22) Filed: Aug. 11, 2020

(65) Prior Publication Data

US 2020/0374685 A1    Nov. 26, 2020

Related U.S. Application Data

(63) Continuation of application No. 16/717,227, filed on Dec. 17, 2019, and a continuation of application No.
(Continued)

(30) Foreign Application Priority Data

Sep. 26, 2016 (IL) .......................................... 248058

(51) Int. Cl.
*H04W 8/12* (2009.01)
*H04L 29/06* (2006.01)
(Continued)

(52) U.S. Cl.
CPC ........... *H04W 8/12* (2013.01); *H04L 63/0853* (2013.01); *H04L 63/30* (2013.01); *H04W 12/02* (2013.01);
(Continued)

(58) Field of Classification Search
CPC ......... H04W 8/12; H04W 12/06; H04W 8/04; H04L 63/0853
See application file for complete search history.

(56) References Cited

U.S. PATENT DOCUMENTS 4,891,650 A * 1/1990 Sheffer ................. B60R 25/102
340/990
6,952,181 B2  10/2005 Karr
(Continued)

FOREIGN PATENT DOCUMENTS

| WO | 2003/009613 | 1/2003 |
| WO | 2006/044291 | 4/2006 |
| WO | 2010/116292 | 10/2010 |

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.
(Continued)

*Primary Examiner* — Minjung Kim
(74) *Attorney, Agent, or Firm* — ISUS Intellectual Property PLLC; Anthony Jason Mirabito (57) ABSTRACT

Methods for obtain identifiers, such as International Mobile Subscriber Identities (IMSIs) and International Mobile Station Equipment Identities (IMEIs), of mobile communication terminals, and associate these identifiers with other items of identifying information provided by users of the terminals. A local interrogation device may be installed that imitates a legitimate base station belonging to a cellular
(Continued)

network, at a control checkpoint. Local interrogation devices are connected to a global interrogation device in a hierarchical network, whereby the local interrogation devices are assigned a priority that is higher than that of the global interrogation device. The global interrogation device provides cellular coverage to a larger area that contains the control checkpoints, while the local interrogation devices provide more localized cellular coverage to the control checkpoints.

18 Claims, 3 Drawing Sheets

Related U.S. Application Data

15/714,874, filed on Sep. 25, 2017, now Pat. No. 10,582,370.

(51) Int. Cl.
*H04W 12/02* (2009.01)
*H04W 12/06* (2021.01)
*H04W 88/08* (2009.01)
*H04W 12/72* (2021.01)
*H04W 8/04* (2009.01)

(52) U.S. Cl.
CPC .............. *H04W 12/06* (2013.01); *H04W 8/04* (2013.01); *H04W 12/72* (2021.01); *H04W 88/08* (2013.01)

(56) References Cited

U.S. PATENT DOCUMENTS

| | | | |
|---|---|---|---|
| 7,374,096 B2 | 5/2008 | Overhultz et al. | |
| 8,215,546 B2 | 7/2012 | Lin et al. | |
| 8,351,900 B2 | 1/2013 | Lotvonen et al. | |
| 8,496,169 B2 | 7/2013 | Christofferson | |
| 9,237,424 B2 | 1/2016 | Nelkenbaum | |
| 9,628,994 B1* | 4/2017 | Gunyel | H04W 68/12 |
| 2003/0017832 A1 | 1/2003 | Anderson et al. | |
| 2003/0222820 A1 | 12/2003 | Karr et al. | |
| 2005/0239478 A1 | 10/2005 | Spirito | |
| 2006/0052085 A1* | 3/2006 | Gregrio Rodriguez | H04W 12/06 455/411 |
| 2006/0089154 A1 | 4/2006 | Laroia et al. | |
| 2008/0150698 A1 | 6/2008 | Smith et al. | |
| 2008/0167049 A1 | 7/2008 | Karr et al. | |
| 2008/0220749 A1* | 9/2008 | Pridmore | H04K 3/65 455/414.1 |
| 2009/0036143 A1 | 2/2009 | Martin et al. | |
| 2010/0078475 A1 | 4/2010 | Lin et al. | |
| 2010/0124931 A1* | 5/2010 | Eskicioglu | H04W 36/32 455/440 |
| 2010/0184421 A1* | 7/2010 | Lindqvist | H04M 15/00 455/418 |
| 2010/0273504 A1* | 10/2010 | Bull | G01S 19/46 455/456.1 |
| 2011/0028162 A1 | 2/2011 | Hazzani | |
| 2011/0080267 A1 | 4/2011 | Clare et al. | |
| 2012/0086555 A1* | 4/2012 | Nelkenbaum | H04W 12/12 340/10.1 |
| 2012/0129517 A1* | 5/2012 | Fox | H04W 12/12 455/425 |
| 2012/0256730 A1 | 10/2012 | Scott et al. | |
| 2014/0148196 A1 | 5/2014 | Bassan-Eskenazi et al. | |

OTHER PUBLICATIONS

Asokan, N., et al., "Man-in-the-Middle in Tunneled Authentication Protocols," Draft version 1.3 (latest public version: http://eprint.iacr.org/2002/163/, Nov. 11, 2002, 15 pages.

Barkan, E.P., "Cryptanalysis of Ciphers and Protocols," Research Thesis submitted to the Senate of the Technion, Israel Institute of Technology, 2006, 200 pages.

"Cell Scanning and Catcher Detection in unnoticeable pocket size," NetHawk C2, Data sheet, version 1.4, EXFO, 2010, 4 pages.

Cellusys, "SS7 Vulnerabilities," e-book, 2016, 53 pages.

Engel, T., "SS7: Locate. Track. Manipulate." 2014, 55 pages.

Flore, D., et al., "Cell Reselection Parameter Optimization in UMTS," $2^{nd}$ International Symposium on Wireless Communication Systems, 2005, 4 pages.

Girardin, F., et al., "Detecting air travel to survey passengers on a worldwide scale," Journal of Location Based Services, 2010, 26 pages.

Kostrzewa, A., "Development of a man in the middle attack on the GSM Um-Interface," Master Thesis, 2011, 88 pages.

Meyer, U., et al., "On the Impact of GSM Encryption and Man-in-the-Middle Attacks on the Security of Interoperating GSM/UMTS Networks," proceedings of the $15^{th}$ IEEE International Symposium on Personal, Indoor and Mobile Radio Communications, 2004, pp. 2876-2883.

Mourad, H., "The Fall of SS7—How Can the Critical Security Controls Help?" The SANS Institute, 2015, 29 pages.

Nohl, K., "Mobile self-defense," Security Research Labs, 2015, 24 pages.

Radiator, EAP-SIM, EAP-AKA and EAP-AKA' Support, White Paper, Open System Consultants Pty.Ltd., 2014, 17 pages.

Signaling System 7 (SS7) Security Report, Positive Technologies, 2014, 15 pages.

Strobel, D., "IMSI Catcher," Seminararbeit, Ruhr-Universität Bochum, 2007, pp. 13-24.

Vedaldi, A., "An implementation of SIFT detector and descriptor," University of California at Los Angeles, 2007, 7 pages.

* cited by examiner

SYSTEM AND METHOD FOR OBTAINING AN IDENTIFIER OF A MOBILE COMMUNICATION TERMINAL AT A CONTROL CHECKPOINT

CROSS-REFERENCE TO RELATED APPLICATIONS

This application is a continuation of U.S. patent application Ser. No. 16/717,227 filed on Dec. 17, 2019, entitled "SYSTEM AND METHOD FOR OBTAINING AN IDENTIFIER OF A MOBILE COMMUNICATION TERMINAL AT A CONTROL CHECKPOINT", which is a continuation of U.S. Pat. No. 10,582,370 filed on Sep. 25, 2017, entitled "SYSTEM AND METHOD FOR OBTAINING AN IDENTIFIER OF A MOBILE COMMUNICATION TERMINAL AT A CONTROL CHECKPOINT", which claims priority to Israel Patent Application No. 248058 filed on Sep. 26, 2016. The contents of which are hereby incorporated by reference.

FIELD OF THE DISCLOSURE

The present disclosure relates generally to the field of communication monitoring, and particularly to the obtaining of identifiers of mobile communication terminals, such as cellular phones.

BACKGROUND OF THE DISCLOSURE

Interrogation devices that solicit mobile communication terminals by imitating the operation of a legitimate base station are sometimes referred to as "International Mobile Subscriber Identity (IMSI) catchers." Examples of IMSI catching techniques are described, for example, by Strobel in "IMSI Catcher," Jul. 13, 2007, which is incorporated herein by reference, by Asokan et al., in "Man-in-the-Middle Attacks in Tunneled Authentication protocols," the 2003 Security Protocols Workshop, Cambridge, UK, Apr. 2-4, 2003, which is incorporated herein by reference, and by Meyer and Wetzel in "On the Impact of GSM Encryption and Man-in-the-Middle Attacks on the Security of Interoperating GSM/UMTS Networks," proceedings of the $15^{th}$ IEEE International Symposium on Personal, Indoor and Mobile Radio Communications, Barcelona, Spain, Sep. 5-8, 2004, pages 2876-2883, which is incorporated herein by reference.

U.S. Pat. No. 9,237,424, whose disclosure is incorporated herein by reference, describes methods and systems for correlating mobile communication terminals with individuals. The methods and systems take advantage of scenarios where individuals pass through control checkpoints, such as passport control and immigration counters. When an individual is served by a control checkpoint, the individual's mobile communication terminal is known to be located in a well-localized geographical area. At the same time, the individual voluntarily provides some identification information, such as his passport details. Thus, this scenario presents an opportunity to correlate the mobile communication terminal and its user with high reliability.

Flore, Dino, et al., "Cell reselection parameter optimization in UMTS," Wireless Communication Systems, 2005, which is incorporated herein by reference, investigates the impact of cell reselection parameters based on field data from different characteristic RF environments collected in commercial networks. Performance metrics are computed for different parameter sets using a simulation platform that makes use of over-sampled channel measurements to improve reliability and includes a standby-time model.

SUMMARY OF THE DISCLOSURE

There is provided, in accordance with some embodiments of the present invention, a system that includes a global interrogation device, configured to solicit a mobile communication terminal, which is within an area to which cellular coverage is provided by the global interrogation device, to associate with the global interrogation device, by imitating a cellular base station belonging to a cellular network with which the mobile communication terminal was previously associated. The system further includes one or more local interrogation devices connected to the global interrogation device in a hierarchical network and configured to provide cellular coverage to one or more subareas of the area, the subareas collectively containing a plurality of sites, at each of which a user of the mobile communication terminal may provide identifying information. The system further includes a processor, configured to identify, upon the mobile communication terminal stopping to associate with the global interrogation device and reassociating with a particular one of the local interrogation devices, a particular one of the sites at which the mobile communication terminal is located, and, in response to identifying the particular one of the sites, to associate, in a database, an identifier of the mobile communication terminal with the identifying information that is provided, by the user, at the particular one of the sites.

In some embodiments, the system is configured such that the local interrogation devices have a different location area code (LAC) from a LAC of the global interrogation device.

In some embodiments, the system is configured such that the local interrogation devices have a priority, within the hierarchical network, that is higher than a priority of the global interrogation device.

In some embodiments, the global interrogation device is further configured to cause the mobile communication terminal to reassociate with the particular one of the local interrogation devices, by handing the mobile communication terminal over, from the global interrogation device, to the particular one of the local interrogation devices.

In some embodiments, the global interrogation device is configured to cause the mobile communication terminal to transmit, to the global interrogation device, a network measurement report (NMR) that indicates respective signal intensities of signals received from one or more of the local interrogation devices, and to hand the mobile communication terminal over to the particular one of the local interrogation devices in response to the respective signal intensities.

In some embodiments,
each local interrogation device of the local interrogation devices is configured to cause the mobile communication terminal to transmit, to the local interrogation device, a network measurement report (NMR) that indicates respective signal intensities of signals received from one or more of the local interrogation devices, and
the processor is configured to identify the particular one of the sites at which the mobile communication terminal is located, based on the signal intensities.

In some embodiments,
each of the local interrogation devices is configured to cause the mobile communication terminal to transmit a signal that is received, at respective signal intensities, by one or more sensors located, respectively, at one or more of the sites, and the processor is configured to identify the particular one of the sites at which the mobile communication terminal is located, based on the signal intensities.

In some embodiments, each of the local interrogation devices is configured to obtain the identifier of the mobile communication terminal, and to communicate the identifier to the processor.

In some embodiments, the identifier includes at least one of: an International Mobile Subscriber Identity (IMSI), and an International Mobile Station Equipment Identity (IMEI).

In some embodiments, the global interrogation device is further configured:

to obtain at least one authentication vector issued by a Home Location Register (HLR) server that serves the cellular network, and to provide cellular service to the mobile communication terminal, subsequently to soliciting the mobile communication terminal, using an encryption key derived from the authentication vector.

There is further provided, in accordance with some embodiments of the present invention, a method that includes, using a global interrogation device, soliciting a mobile communication terminal, which is within an area to which cellular coverage is provided by the global interrogation device, to associate with the global interrogation device, by imitating a cellular base station belonging to a cellular network with which the mobile communication terminal was previously associated, the area including one or more subareas to which cellular coverage is provided, respectively, by one or more local interrogation devices that are connected to the global interrogation device in a hierarchical network, the subareas collectively containing a plurality of sites, at each of which a user of the mobile communication terminal may provide identifying information. The method further includes, subsequently, upon the mobile communication terminal stopping to associate with the global interrogation device and reassociating with a particular one of the local interrogation devices, identifying a particular one of the sites at which the mobile communication terminal is located, and, in response to identifying the particular one of the sites, associating, in a database, an identifier of the mobile communication terminal with the identifying information that is provided, by the user, at the particular one of the sites.

In some embodiments, the sites include a plurality of control checkpoints in an immigration hall.

The present disclosure will be more fully understood from the following detailed description of embodiments thereof, taken together with the drawings, in which:

DETAILED DESCRIPTION OF EMBODIMENTS

Overview

Embodiments described herein help security and law-enforcement agencies obtain identifiers, such as International Mobile Subscriber Identities (IMSIs) and International Mobile Station Equipment Identities (IMEIs), of mobile communication terminals, and associate these identifiers with other items of identifying information provided by users of the terminals.

A typical application is the monitoring of individuals passing through control checkpoints, e.g., within an immigration hall of an airport. At a control checkpoint, a traveler is typically required to present an identifying document, such as a passport, for inspection. If it could be ascertained that a particular traveler's mobile communication terminal was located at the control checkpoint at the time that the identifying document was presented, the identifier of the traveler's mobile communication terminal could be associated with the identifying document. Such an association could then be used, for example, to track subsequent movement and activity of the traveler, by tracking the movement and activity of the traveler's mobile communication terminal.

One solution is to install a respective interrogation device, configured to imitate a legitimate base station belonging to a cellular network, at each control checkpoint. Each interrogation device could then solicit any mobile communication terminals arriving at the checkpoint to associate with the interrogation device, and then obtain the respective identifiers of these mobile communication terminals. A challenge, however, is that an individual typically remains at a control checkpoint for only a brief period of time, such that there is typically not enough time to complete the "capture" of the individual's mobile communication terminal while the individual is at the control checkpoint.

Embodiments described herein therefore improve upon the above-described solution, by providing—in addition to the "local" interrogation devices that cover the control checkpoints—a "global" interrogation device. The local interrogation devices are connected to the global interrogation device in a hierarchical network, whereby the local interrogation devices are assigned a priority that is higher than that of the global interrogation device. The global interrogation device provides cellular coverage to the immigration hall that contains the control checkpoints (and, optionally, pathways leading into the immigration hall), while the local interrogation devices provide more localized cellular coverage to the control checkpoints.

Upon a mobile communication terminal entering the immigration hall, the global interrogation device solicits the mobile communication terminal to associate with the global interrogation device. (In other words, the global interrogation device captures the mobile communication terminal.) Subsequently, upon the mobile communication terminal reaching the control checkpoints, the mobile communication terminal stops associating with the global interrogation device, and reassociates with one of the local interrogation devices, due to the higher priority of the local interrogation devices. This local interrogation device then obtains at least one identifier of the mobile communication terminal, and is further used to identify the control checkpoint at which the user of the mobile communication terminal is located. Subsequently, identifying information provided by the user at the control checkpoint may be associated, in a database, with the identifier of the mobile communication terminal.

Since (i) the capture of the mobile communication terminals is performed in advance, before the mobile communication terminals reach the control checkpoints, and (ii) the reassociation procedure is relatively quick, it is possible to associate the identifiers of the mobile communication terminals with identifying information provided at the control checkpoints, even if the users of the mobile communication terminals pass through the control checkpoints relatively quickly.

More generally, embodiments described may be applied to any situation in which identifying information is provided at one or more designated sites. A global interrogation device may cover a relatively wide area that contains the sites, and capture mobile communication terminals that enter this area. One or more local interrogation devices, which are assigned a higher priority than that of the global interrogation device, may cover subareas of the area that collectively contain the sites. As a captured mobile communication terminal approaches the subareas, the mobile communication terminal may quickly reassociate with one of the local interrogation devices, and this local interrogation device may then be used to identify the particular site at which the mobile communication terminal is located. Identifying information provided at the site may then be associated, in a database, with an identifier of the mobile communication terminal.

It is noted that the provision of information at the designated sites may be actively performed, as is typically the case at a control checkpoint, or passively performed. As an example of the latter, a user of a mobile communication terminal may be required to pass through a particular site that is under video surveillance. A local interrogation device may therefore be deployed at the site, such that, upon reaching the site, the user's mobile communication terminal reassociates with the local interrogation device. The image of the user that is passively provided by the user (by virtue of the user being recorded on video) may then be associated, in a database, with an identifier of the mobile communication terminal.

As yet another example, the system described herein may be installed at a vehicular border crossing having multiple control checkpoints, such that, as vehicles approach the control checkpoints, the mobile communication terminals of the occupants of the vehicles reassociate with the local interrogation devices. Each mobile communication terminal identifier may then be associated with an appropriate passport scan, and/or with an appropriate license plate number, obtained, for example, by automatic license plate recognition techniques.

SYSTEM DESCRIPTION

Introduction

Figure 1:
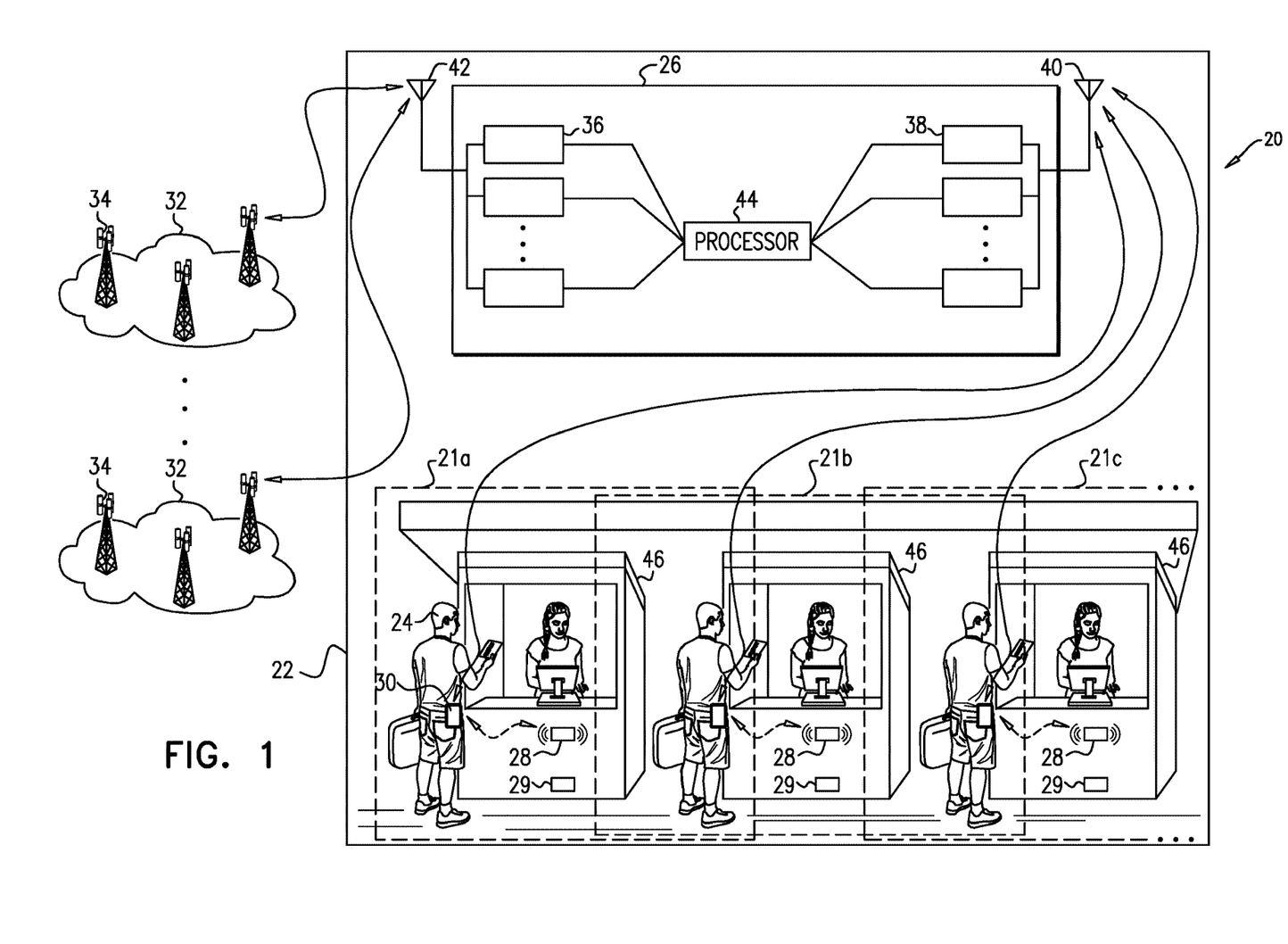
FIG. 1 is a schematic illustration of a system for associating an identifier of a mobile communication terminal with identifying information provided by a user of the mobile communication terminal, in accordance with some embodiments of the present disclosure.
Figure 2:
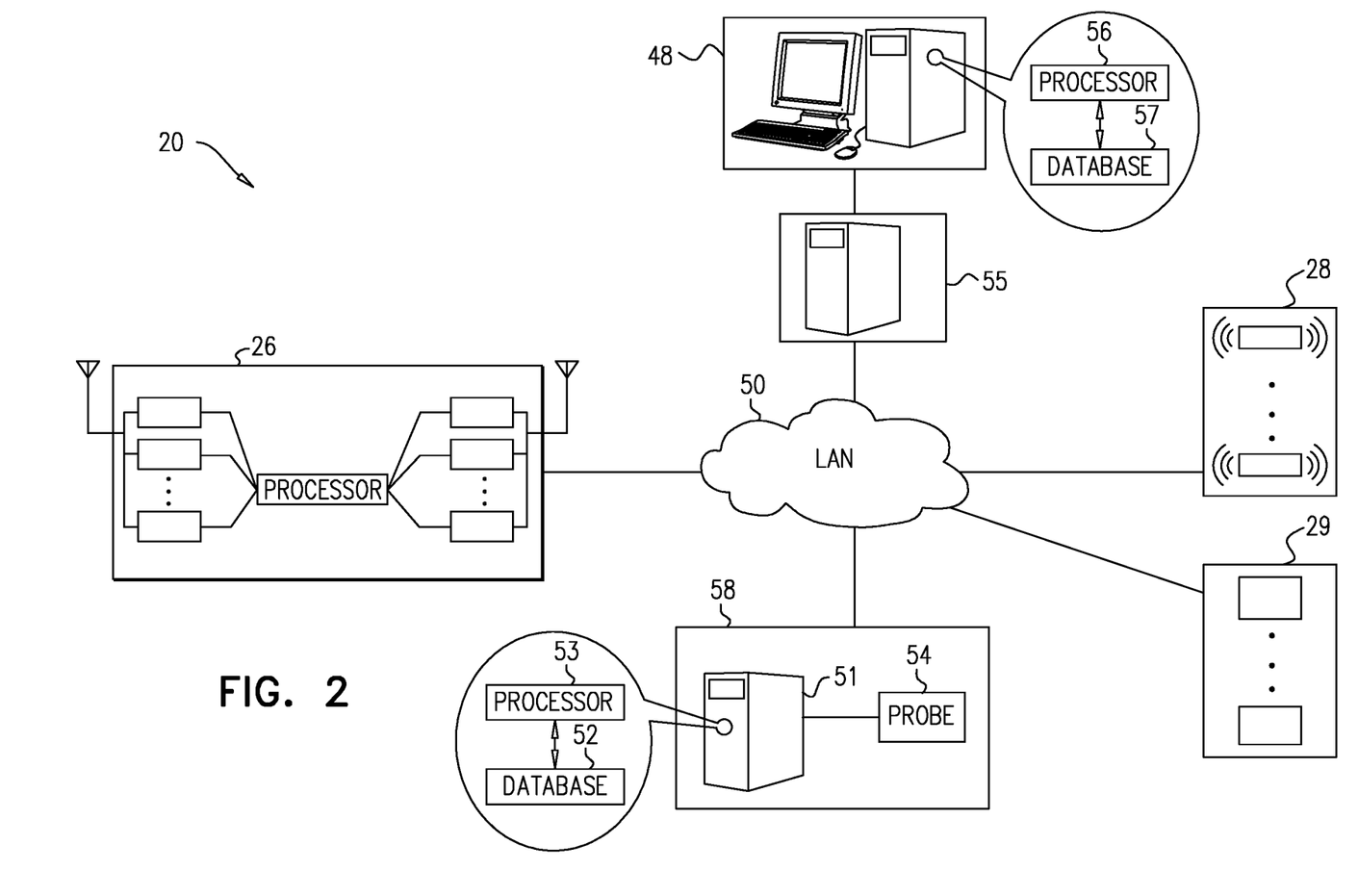
FIG. 2 is a schematic architectural layout of the system illustrated in FIG. 1, in accordance with some embodiments of the present disclosure.

Reference is initially made to FIG. 1, which is a schematic illustration of a system 20 for associating an identifier of a mobile communication terminal with identifying information provided by a user of the mobile communication terminal, in accordance with some embodiments of the present disclosure. Reference is also made to FIG. 2, which is a schematic architectural layout of system 20, in accordance with some embodiments of the present disclosure. (FIG. 2 shows some components of system 20 that are not shown in FIG. 1.)

FIG. 1 depicts an immigration hall 22. System 20, which is deployed in immigration hall 22, comprises a private hierarchical network, such as a private hierarchical Universal Mobile Telecommunications Service (UMTS) network, comprising a global interrogation device 26 and a plurality of local interrogation devices 28. Global interrogation device 26, which provides cellular coverage to the immigration hall, solicits mobile communication terminals 30 that enter the immigration hall to associate with the global interrogation device, by imitating, for each of mobile communication terminals 30, a cellular base station 34 belonging to the cellular network 32 with which the mobile communication terminal was previously associated. For example, the global interrogation device may solicit a mobile communication terminal by transmitting a soliciting signal at a relatively high power level, and/or using directional antennas, such that the soliciting signal is received by the mobile communication terminal at an intensity that is greater than that of any signals received from base stations 34. Upon receiving such a soliciting signal, the mobile communication terminal (incorrectly) identifies the source of the signal—the global interrogation device—as a base station (or "cell") of the cellular network. The mobile communication terminal then reassociates with the global interrogation device.

In contrast to global interrogation device 26, which provides cellular coverage to a relatively wide area (in this case, the entire immigration hall), local interrogation devices 28 provide cellular coverage to only narrower subareas of the area. For example, in FIG. 1, the local interrogation devices provide cellular coverage, respectively, to subareas 21*a*, 21*b*, and 21*c*, which collectively contain a plurality of control checkpoints 46. (As shown in FIG. 1, the subareas may overlap with each other, such that a mobile communication terminal may, depending on its location, be within range of more than one of the local interrogation devices.) Local interrogation devices 28 are typically connected to the global interrogation device, and to other components of system 20, over a local area network (LAN) 50.

It is noted that the local interrogation devices need not necessarily be configured to solicit mobile communication terminals in the manner described above for the global interrogation device, since, as further described below, mobile communication terminals are caused to associate with the local interrogation devices without such prior solicitation.

In the hierarchy that is defined for the hierarchical network, the local interrogation devices are assigned a priority that is higher than that of the global interrogation device. As further described below, the assignment of the higher priority causes mobile communication terminals captured by the global interrogation device to reassociate with the local interrogation devices, upon the mobile communication terminals entering the subareas covered by the local interrogation devices. This reassociation is indicated in FIG. 1 by the dashed bidirectional arrows connecting the mobile communication terminals with the local interrogation devices.

It is noted that in the context of the present application, including the claims, the words "global" and "local" are used relativistically, with respect to one another. That is, the word "global" indicates that the global interrogation device covers the entire area that is collectively covered by the local interrogation devices (and, typically, additional area), while the word "local" indicates that each local interrogation device covers only a subarea of the area that is covered by the global interrogation device.

System 20 further comprises a management-and-analysis module 48 (FIG. 2). In addition to controlling and monitoring the other components of the system, management-and-analysis module 48 stores the identifiers of captured mobile communication terminals, which may be received, over LAN 50, for example, from the global interrogation device and/or local interrogation devices. Typically, the management-and-analysis module also associates these identifiers with identifying information—e.g., passport information—provided by the users 24 of the mobile communication terminals. Typically, the management-and-analysis module comprises a processor 56, which performs the associations based on communication (e.g., over LAN 50) with the interrogation devices and with any other appropriate hardware and/or software contained within the subareas. For example, processor 56 may receive, from a given control checkpoint, a scan of a passport, and may associate this scan with an identifier of a mobile communication terminal that was known to have been located, at around the time of the scan, at the given control checkpoint. Processor 56 typically stores the identifiers and identifying information, in association with each other, in a database 57.

The portion of the specification below describes four steps that, when executed sequentially by system 20, allow an identifier of a captured mobile communication terminal to be associated with identifying information provided by a user of the mobile communication terminal. During the course of this description, other components of system 20, which were not heretofore described, are described.

Step One: Capturing a Mobile Communication Terminal

As noted above, upon a mobile communication terminal entering immigration hall 22, the mobile communication terminal is captured by the global interrogation device. Subsequently, while the mobile communication terminal is associated with the global interrogation device, the global interrogation device may provide cellular service to the mobile communication terminal, as further described below, such that the mobile communication terminal may continue, for example, to exchange voice, data, and text messages over the cellular network that normally provides service to the mobile communication terminal.

Notwithstanding the above, in some cases, to better disguise the presence of the global interrogation device, the global interrogation device may deny an exchange of communication with a captured mobile communication terminal. Furthermore, the global interrogation device may be assigned the same location area code (LAC) as the nearest base station belonging to the cellular network, such that, upon being captured by the global interrogation device, the mobile communication terminal does not transmit a "location update" message that may reveal the presence of the global interrogation device.

When providing service to the captured mobile communication terminal, the global interrogation device acts as a "man-in-the-middle," intermediating the exchange of communication between the mobile communication terminal and the cellular network with which the mobile communication terminal was previously associated. That is, from the perspective of the mobile communication terminal, the global interrogation device mimics the behavior of a legitimate base station, while from the perspective of the cellular network, the global interrogation device mimics the behavior of the mobile communication terminal. Typically, the global interrogation device comprises a plurality of transmitter-receivers (transceivers) 38, which imitate respective base stations of various cellular networks, and a plurality of modems 36, which behave as clones of respective captured mobile communication terminals. (Modems 36 may be located separately from the rest of the global interrogation device.) Communication between the transceivers and the mobile communication terminals may be exchanged via a first antenna 40, while communication between the modems and the cellular networks may be exchanged via a second antenna 42. The global interrogation device further comprises a processor 44, which inter alia, drives the performance of the various functions of the global interrogation device that are described herein.

In some cases, further to associating with the global interrogation device, a mobile communication terminal may continue to use the communication protocol that the mobile communication terminal was previously using. In some embodiments, however, the global interrogation device causes all captured mobile communication terminals to switch to a common communication protocol, such as the UMTS protocol or the Long Term Evolution (LTE) protocol. Communication is then exchanged between the mobile communication terminals and the global interrogation device, in accordance with the common protocol.

The provision of cellular service to the captured mobile communication terminal is facilitated by a service-providing module 58 (FIG. 2), which may be connected to the global interrogation device (and to other components of system 20) over LAN 50, for example. In some embodiments, service-providing module 58 comprises a database 52 of authentication vectors that were issued by the respective Home Location Register (HLR) servers that serve cellular networks 32. Encryption keys derived from these authentication vectors are used for communication sessions intermediated by the global interrogation device, as further described below. As shown in FIG. 2, database 52 is typically stored on a server 51.

Typically, at least one probe 54 deployed on the Signaling System 7 (SS7) network is used to continually obtain authentication vectors, as these authentication vectors are communicated from HLR servers to other entities on the SS7 network. Probe 54 stores each of these authentication vectors in database 52, in association with an identifier (e.g., an IMSI) of the mobile communication terminal for which the authentication vector was issued. Upon the global interrogation device capturing a mobile communication terminal, the global interrogation device requests the relevant identifier from the captured mobile communication terminal, and then retrieves, from database 52, one or more authentication vectors that are associated, in database 52, with this identifier. The global interrogation device may then use these authentication vectors to provide cellular service to the captured mobile communication terminal, as described above.

In some cases, the authentication vectors obtained in advance by probe 54 may not be usable by the global interrogation device. For example, some communication protocols prevent the reuse of authentication vectors, e.g., after a particular interval of time has transpired from a previous use. Since the authentication vectors obtained in advance by probe 54 are likely to have already been used, at least some of these authentication vectors might no longer be usable. Furthermore, even if some authentication vectors retrieved from database 52 are initially usable, these authentication vectors may become unusable, following one or more uses by the global interrogation device.

Hence, authentication vectors are also acquired in real-time, such that unused authentication vectors may be provided to the global interrogation device. Upon the cellular network sending a request to begin a communication session with a captured mobile communication terminal, or vice versa, the mobile switching center (MSC) that manages the cellular network requests one or more authentication vectors from the HLR server that serves the cellular network. These authentication vectors are caught by probe 54, and immediately stored, by the probe, in database 52, in association with an identifier of the captured mobile communication terminal. A processor 53 of server 51 then immediately retrieves these authentication vectors, by querying the database for the identifier of the mobile communication terminal, and passes these authentication vectors to the global interrogation device. The global interrogation device thus obtains these authentication vectors in real-time, for use in the requested communication session.

In some cases, new authentication vectors may be issued by the relevant HLR server, upon the cloning of the captured mobile communication terminal by the global interrogation device. These unused authentication vectors may be immediately obtained by the global interrogation device, via probe 54 and server 51, as described above.

Typically, due to the relatively large number of database updates required for the functioning of database 52 as described above, database 52 is stored in-memory on (i.e., within the random-access memory (RAM) of) server 51, in order to expedite the update operations.

Step Two: Reassociation with a Local Interrogation Device

As the user of the captured mobile communication terminal approaches the control checkpoints, the mobile communication terminal enters at least one of the subareas covered by the local interrogation devices. The mobile communication terminal then reassociates with one of the local interrogation devices. In general, this reassociation may occur in one of the following two ways:

(i) Cell Reselection

In a cell reselection procedure, a mobile communication terminal initiates a reassociation while in idle mode, i.e., while not engaged in a call.

System 20 is configured such that each captured mobile communication terminal may reassociate with a local interrogation device by performing cell reselection. In particular, each of the interrogation devices, whether global or local, is configured to behave as a normal cell in a cellular network, by continually broadcasting system information block (SIB) data. The SIB data include the priority of the interrogation device within the hierarchical network of interrogation devices, cell reselection criteria, and a list of neighboring cells, which typically includes all of the other interrogation devices.

In response to the list of neighboring cells received from the global interrogation device, the captured mobile communication terminal continually "listens" for the local interrogation devices, by tuning to the resources (e.g., times, frequencies, and/or codes) used by the local interrogation devices. Thus, as the mobile communication terminal approaches control checkpoints 46, and hence enters into one or more of the subareas that are covered by the local interrogation devices, the mobile communication terminal detects signals, including SIB-data broadcasts, from one or more of the local interrogation devices. If at least one of these signals, from a particular one of the local interrogation devices, satisfies the cell reselection criteria, the mobile communication terminal reassociates with the particular one of the local interrogation devices, given the higher priority (relative to that of the global interrogation device) indicated in the SIB broadcast from the particular one of the local interrogation devices. In other words, the mobile communication terminal stops associating with the global interrogation device, and instead associates with the particular one of the local interrogation devices. (The prefix "re" in the word "reassociate," as used herein, does not imply that the mobile communication terminal was previously associated with the local interrogation device.)

Typically, a necessary condition for reassociating with a particular local interrogation device via cell reselection is that the signal from the local interrogation device be received at an intensity that is greater than a threshold intensity specified in the cell reselection criteria, and is also greater than the intensity of any other signal received from another one of the local interrogation devices. The cell reselection criteria typically also specify a parameter "Treselection," which indicates a duration of time during which the greater-intensity signal needs to be detected, prior to the reassociation. This parameter may be assigned, during configuration of the system, a relatively low value, such that cell reselection occurs relatively quickly.

(ii) Handover

In a handover procedure, the MSC of a cellular network, via the cell with which a mobile communication terminal is currently associated, instructs the mobile communication terminal to reassociate with another cell. A handover occurs when the mobile communication terminal is not in idle mode, i.e., when the mobile communication terminal is engaged in a call.

System 20 comprises an MSC 55, which manages the hierarchical network of interrogation devices. Upon identifying that a captured mobile communication terminal, while engaged in a call, is sufficiently close to a local interrogation device, MSC 55, via the global interrogation device, instructs the mobile communication terminal to reassociate with the local interrogation device. (Since the handover instructions are delivered via the global interrogation device, however, the present application, for simplicity, generally refers to handovers as being performed by the global interrogation device.)

Typically, the global interrogation device is configured to request, from each captured mobile communication terminal that is not idle, periodic network measurement reports (NMRs) that indicate the respective intensities of any signals, from the "neighboring cells" of the global interrogation device, that were detected by the mobile communication terminal. As a non-idle captured mobile communication terminal approaches the control checkpoints, therefore, the mobile communication terminal transmits, to the global interrogation device, an NMR that includes the respective intensities of signals (e.g., SIB-data broadcasts) received from one or more of the local interrogation devices. In response to the signal intensities reported in the NMR, the global interrogation device may hand the mobile communication terminal over to a particular one of the local interrogation devices. For example, the global interrogation device may hand the mobile communication terminal over to the local interrogation device whose signal was detected at an intensity that is greater than that of any of the other detected signals. (Typically, the global interrogation device further compares the reported signal intensity to a threshold, and hands the mobile communication terminal over only if the signal intensity is greater than the threshold.)

Typically, the global interrogation device instructs the mobile communication terminal to send NMRs to the global interrogation device at a relatively high frequency (e.g., once per second), such that the mobile communication terminal may be handed over to the relevant local interrogation device relatively quickly, upon the mobile communication terminal entering the subarea that is covered by this local interrogation device.

Similarly to the global interrogation device, each of local interrogation devices 28 may comprise a processor, a plurality of transceivers, and a plurality of modems, as described above for the global interrogation device. While associated with a mobile communication terminal, a local interrogation device may provide cellular service to the mobile communication terminal (e.g., using authentication vectors from database 52), as described above for the global interrogation device. Alternatively, if the user is expected to remain within a subarea for only a brief period of time—and especially if usage of the mobile communication terminal is unlikely to occur within the subarea—the local interrogation device might not provide cellular service to the mobile communication terminal. In such a case, the local interrogation device need not necessarily comprise any modems.

(It is noted that even if a local interrogation device does not provide cellular service, the local interrogation device is said to provide "cellular coverage" to the subarea, in that cellular devices within the subarea are within range of the local interrogation device, and hence may communicate with the local interrogation device.)

Typically, the local interrogation devices are assigned a different location area code (LAC) from the LAC of the global interrogation device, such that, following the reassociation, the mobile communication terminal transmits a location update message. Upon receiving the location update message, the local interrogation device is notified of the reassociation. The local interrogation device typically then retrieves one or more relevant authentication vectors from database 52, and uses these authentication vectors to validate the location update. Subsequently, the local interrogation device may obtain, from the mobile communication terminal, at least one identifier of the mobile communication terminal that is to be associated, later, with the identifying information of interest. The identifier is then communicated to processor 56.

Each of the local interrogation devices may be configured to obtain any suitable identifiers, including, for example, IMSIs and IMEIs. An advantage of associating an IMEI with identifying information is that even if the user of the mobile communication terminal subsequently changes the subscriber identification module (SIM) of the mobile communication terminal (as is commonly done upon entering a new country), the IMEI of the mobile communication terminal does not change.

In some cases, the local interrogation device need not necessarily request the identifier from the mobile communication terminal. For example, the location update message from the mobile communication terminal may already contain the desired identifier. Alternatively or additionally, the global interrogation device may obtain the relevant identifier from the mobile communication terminal prior to the reassociation, and then communicate this identifier to the local interrogation device during a handover procedure, or in response to receiving a location update message.

Step Three: Identifying the Nearest Control Checkpoint

The association of a user's mobile communication terminal with a particular local interrogation device, during Step Two, facilitates identifying the control checkpoint at which the user is standing.

In some cases, as further described below, the control checkpoint may be identified in response to identifying the location of the local interrogation device with which the mobile communication terminal reassociated. Typically, however, identifying the location of the local interrogation device is not sufficient. For example, a subarea covered by a local interrogation device may include more than one control checkpoint, either by choice, or for lack of any other alternative. As an example of the latter, the control checkpoints may be located relatively close to each other, such that, even if a respective local interrogation device is assigned to each control checkpoint (as illustrated in FIG. 1), the coverage of a given local interrogation device may extend also to one or more of its neighboring control checkpoints. FIG. 1 illustrates such a scenario, whereby each of subareas 21*a-c* includes (at least part of) more than one control checkpoint. It is thus possible, for example, that the mobile communication terminal of a user standing at the middle control checkpoint, which is within subarea 21*b*, reassociated with the leftmost local interrogation device, which covers subarea 21*a*.

Moreover, even if each subarea were to include only one control checkpoint, it is possible for a mobile communication terminal to reassociate with the "wrong" local interrogation device. For example, it is possible that a user passed in front of a first control checkpoint on his way to a second checkpoint, such that his mobile communication terminal "incorrectly" reassociated with the local interrogation device that covers the first control checkpoint.

Hence, Step Three typically includes the performance of one, or both, of the following techniques, which help identify the particular one of the control checkpoints at which the mobile communication terminal is located:

(i) The local interrogation device with which the mobile communication terminal is associated may cause the mobile communication terminal to transmit, to the local interrogation devices, an NMR that indicates respective signal intensities of signals received from one or more of the local interrogation devices, by requesting such an NMR from the mobile communication terminal. The NMR may indicate, for example, a signal intensity received from the requesting local interrogation device, along with respective signal intensities received from the other local interrogation devices. Processor 56 then identifies the particular control checkpoint at which the mobile communication terminal is located, based on the signal intensities. For example, the local interrogation device may identify the control checkpoint corresponding to the highest signal intensity, and then notify the processor of this control checkpoint. Alternatively, the processor may receive all of the signal intensities from the local interrogation device, and then identify the control checkpoint corresponding to the highest signal intensity.

For example, with reference to FIG. 1, if the highest signal intensity was received from the middle local interrogation device, which covers subarea 21*b*, the middle control checkpoint may be identified as the control checkpoint at which the mobile communication terminal is located, since the middle control checkpoint is closest to the middle local interrogation device. Thus, even if the mobile communication terminal reassociated with the leftmost local interrogation device, it may be determined that the mobile communication terminal is actually located at the middle control checkpoint. (In this scenario, the mobile communication terminal does not necessarily reassociate with the middle local interrogation device.)

It is noted that each of the local interrogation devices may be configured to request NMRs, at any suitable frequency, from any mobile communication terminal with which it is associated.

(ii) The local interrogation device with which the mobile communication terminal is associated may cause the mobile communication terminal to transmit a "location-ascertaining" signal that is received, at respective signal intensities, by one or more radiofrequency (RF) sensors 29 located, respectively, at one or more of the sites. (Typically, a respective sensor 29 is located at each of the sites.) Based on the respective signal intensities, processor 56 may identify the particular control checkpoint at which the mobile communication terminal is located.

For example, with reference to FIG. 1, if the highest signal intensity was received by the middle sensor 29, the middle control checkpoint may be identified as the control checkpoint at which the mobile communication terminal is located, since the middle control checkpoint is closest to the middle sensor. Thus, even if the mobile communication terminal reassociated with the leftmost local interrogation device, it may be determined that the mobile communication terminal is actually located at the middle control checkpoint.

To cause the mobile communication terminal to transmit this location-ascertaining signal, the local interrogation device typically transmits a message to the mobile communication terminal that specifies a particular scrambling code and frequency. The local interrogation device further transmits these parameters to sensors 29, and the sensors, in response thereto, tune to the specified scrambling code and frequency. The mobile communication terminal then transmits a signal (with arbitrary content) at the specified scrambling code and frequency, and this signal is detected, at different respective signal intensities, by the sensors.

Technique (ii) may be particularly helpful in the event that there is no one-to-one correspondence between the control checkpoints and the local interrogation devices. For example, in some embodiments, a single local interrogation device may cover all of the control checkpoints. In such a case, technique (i) might not help identify the control checkpoint at which the mobile communication terminal is located (unless the distance from the mobile communication terminal to the single local interrogation device could be derived, precisely, from the signal intensity reported in the NMR). Using technique (ii), however, the location of the mobile communication terminal could be identified, assuming a respective sensor is deployed at each of the control checkpoints.

Typically, the above-described signal-intensity information that is received by the local interrogation devices and/or sensors is passed to processor 56, e.g., over LAN 50, and processor 56 then processes this information such as to identify the location of the mobile communication terminal. In some embodiments, however, as described above, the local interrogation device may process this information such as to identify the location, and then communicate the identified location to processor 56.

Typically, Step Three is repeatedly performed, such that processor 56 effectively obtains a range of times at which the mobile communication terminal was located at a particular control checkpoint. For example, at each of the times 9:00:00, 9:00:30, and 9:01:00, it may be ascertained, by performing Step Three, that the mobile communication terminal is located at a particular control checkpoint. The processor thus ascertains that the mobile communication terminal was located at the particular control checkpoint at least between 9:00:00 and 9:01:00.

As noted above, it may be possible to locate the mobile communication terminal without performing either one of the techniques described above, particularly if there is a one-to-one assignment between the local interrogation devices and the control checkpoints. For example, the control checkpoints (and, hence, local interrogation devices) may be sufficiently far apart from each other, such that there is no chance of a user's mobile communication terminal associating with the "wrong" local interrogation device. Alternatively or additionally, the control checkpoints may be separated from each other by suitable radiofrequency-blocking partitions, such as glass walls with internal RF shields. In these scenarios, the location of the local interrogation device with which the mobile communication terminal reassociated indicates the control checkpoint at which the mobile communication terminal is located.

Step Four: Associating an Identifier of the Mobile Communication Terminal with Identifying Information Provided by the User In response to identifying the control checkpoint at which the mobile communication terminal is located, processor 56 associates, in database 57, an identifier of the mobile communication terminal with information that is provided, by the user of the mobile communication terminal, at the control checkpoint.

Typically, processor 56 is configured to receive, from each of the control checkpoints, identifying information that is provided at the control checkpoints, along with corresponding time stamps for this information. For example, processor 56 may receive, from each of the control checkpoints, scans of passports that were presented at the control checkpoint, along with the respective times at which these scans were obtained. For each of these scans, the processor may search for identifiers of mobile communication terminals that are likely to have been located at the control checkpoint at the time at which the scan was obtained. For example, the processor may search for identifiers of mobile communication terminals that were located at the control checkpoint within a particular threshold of time from the time at which the scan was obtained, and/or were located at the control checkpoint for a range of times within which the scan time lies. Thus, for example, if the processor ascertains that a particular mobile communication terminal was located at the control checkpoint at least between 9:00:00 and 9:01:00, the processor may associate the identifier of this mobile communication terminal with a passport scan that was acquired at 9:00:45 (which is between 9:00:00 and 9:01:00), and/or with a passport scan that was acquired at 9:01:05 (which is relatively close to 9:01:00).

It is noted that the processor may associate a particular identifier with multiple items of identifying information, or, conversely, a particular item of identifying information with multiple identifiers. For example, a group of users (e.g., a family), carrying multiple mobile communication terminals having respective identifiers, may pass through a control checkpoint together. In such a situation, each of the passport-scans of these users may be associated with all of the identifiers. (This implies that each of the identifiers is associated with all of the passport scans.)

In general, each of processor 44, the respective processors of the local interrogation devices, processor 53, and processor 56 may be embodied as a single processor, or as a cooperatively networked or clustered set of processors. Each of these processors is typically a programmed digital computing device comprising a central processing unit (CPU), random access memory (RAM), non-volatile secondary storage, such as a hard drive or CD ROM drive, network interfaces, and/or peripheral devices. Program code, including software programs, and/or data, are loaded into the RAM for execution and processing by the CPU, and results are generated for display, output, transmittal, or storage, as is known in the art. The program code and/or data may be downloaded to the processor in electronic form, over a network, for example, or they may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

It is noted that the architectural layout depicted in FIG. 2 is only one of many possible such layouts. In general, the various components of system 20 may be interconnected in any suitable fashion.

Figure 3:
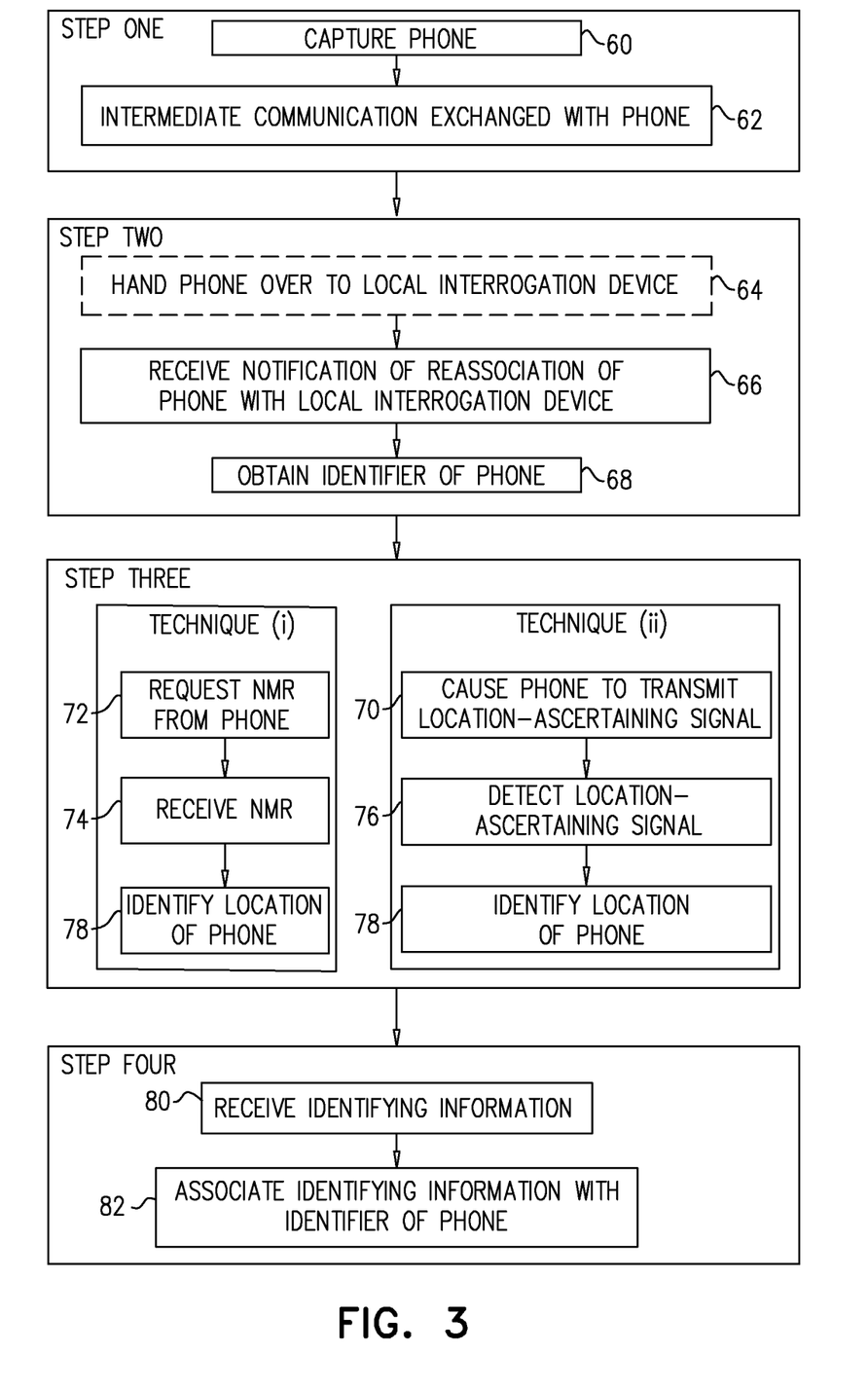
FIG. 3 is a flow diagram for a method for associating an identifier of a mobile communication terminal with identifying information provided by a user of the mobile communication terminal, in accordance with some embodiments of the present disclosure.

Reference is now made to FIG. 3, which is a flow diagram for a method for associating an identifier of a mobile communication terminal with identifying information provided by a user of the mobile communication terminal, in accordance with some embodiments described herein. FIG. 3 shows the three steps referred to above—namely, Step One, Step Two, Step Three, and Step Four—subdivided into smaller steps. (For simplicity, FIG. 3 refers to the mobile communication terminal as a "phone," although embodiments described herein may also be applied to other types of mobile communication terminals.)

Step One begins with a capturing step 60, at which a mobile communication terminal is captured by the global interrogation device. Following the capture, the global interrogation device may intermediate communication exchanged with the mobile communication terminal (and thus provide continued cellular service to the mobile communication terminal), at an intermediating step 62. For simplicity, FIG. 3 does not show all the particulars of the intermediation that were described above, such as the obtaining of authentication vectors.

In Step Two, the mobile communication terminal first reassociates with a local interrogation device. Usually, this reassociation occurs via the cell reselection procedure. Since system 20 is generally passive during cell reselection, FIG. 3 does not show a step for cell reselection. (For simplicity, FIG. 3 also does not show the broadcasting of SIB data, which causes the cell reselection to occur.) Sometimes, however, a handover is necessary, as described above. Hence, FIG. 3 shows a handover step 64, at which the mobile communication terminal is handed over, by the global interrogation device, to the local interrogation device. (Handover step 64 is drawn with a broken border, to indicate that the step is usually not performed.)

Next, at a notification-receiving step 66, the local interrogation device receives notification that the mobile communication terminal has reassociated with the local interrogation device. The local interrogation device, at an identifier-obtaining step 68, then obtains an identifier of the mobile communication terminal.

In Step Three, one, or both, of Technique (i) and Technique (ii) may be performed, typically repeatedly, as described above.

In Technique (i), the local interrogation device requests an NMR from the mobile communication terminal, at an NMR-requesting step 72. The local interrogation device then receives the NMR, at an NMR-receiving step 74. Typically, the local interrogation device communicates the information in the NMR to processor 56, and processor 56 then identifies the location of the mobile communication terminal, at a location-identifying step 78.

In Technique (ii), the local interrogation device, at a transmit-causing step 70, causes the mobile communication terminal to transmit a location-ascertaining signal. This signal is detected, at respective signal intensities, by sensors 29, at a signal-detecting step 76. Typically, the detected signal intensities are communicated by the sensors to processor 56, and processor 56 then identifies the location of the mobile communication terminal, at location-identifying step 78.

Subsequently, in Step Four, the identifier of the mobile communication terminal is associated with identifying information provided at the identified location during the period of time during which the mobile communication terminal was located at the identified location. First, at an identifying-information-receiving step 80, processor 56 receives the identifying information that was provided. At an associating step 82, processor 56 then stores the identifier of the mobile communication terminal, in association with the identifying information, in database 57.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A local interrogation device comprising:
a processor configured to:
solicit a mobile communication terminal to associate with the local interrogation device, by imitating a cellular base station belonging to a cellular network with which the mobile communication terminal was previously associated;
obtain an identifier of the mobile communication terminal;
identify a control checkpoint of a plurality of control checkpoints that the mobile communication terminal is located;
receive identifying information provided by a user of the mobile communication terminal at the identified control checkpoint; and
associate the identifier of the mobile communication terminal with the identifying information, wherein the local interrogation device is configured to have a different location area code (LAC) from a LAC of a nearest cellular base station and a global interrogation device connected to each of the one or more local communication devices and the global interrogation device configured to intermediate the exchange of communication between the mobile communication terminal and the cellular base station with which the mobile communication terminal was previously associated;
a global interrogation device instructs the mobile communication terminal to connect the one or more local interrogation devices replacing the global interrogation device such that the one or more local interrogation devices act as an intermediate for communications between the mobile communication terminal and the cellular base station.

2. The local interrogation device of claim 1, wherein the processor is further configured to identify a location of the local interrogation device, and further wherein the identifying information was provided by the user at the identified location.

3. The local interrogation device of claim 1, wherein the processor is further configured to:
cause the mobile communication terminal to transmit a location-ascertaining signal to each sensor of a plurality of sensors, wherein each sensor is located at a control point of the plurality of control points; and
based on a signal intensity of the location-ascertaining signal received by each sensor of the plurality of sensors, identify the control checkpoint of a plurality of control checkpoints that the mobile communication terminal is located.

4. The local interrogation device of claim 1, wherein the identifier includes at least one of: an International Mobile Subscriber Identity (IMSI), and an International Mobile Station Equipment Identity (IMEI).

5. The local interrogation device of claim 1, wherein the processor is further configured to
determine a range of times when the user was located at a control point;
determine a time when the identifying information was provided; and
associate the identifier of the the mobile communication terminal with the identifying information if the determined time is within the range of time.

6. The local interrogation device of claim 1, wherein the identifying information comprises a scan of a passport, a license plate number, or an image of the user.

7. A system comprising:
one or more local interrogation devices, wherein each local interrogation device is configured to solicit a mobile communication terminal to associate with the local interrogation device, by imitating a cellular base station belonging to a cellular network with which the mobile communication terminal was previously associated;
a global interrogation device connected to each of the one or more local communication devices and the global interrogation device configured to intermediate the exchange of communication between the mobile communication terminal and the cellular base station with which the mobile communication terminal was previously associated; and
a processor of the local interrogation device configured to:
obtain an identifier of the mobile communication terminal;
identify a control checkpoint of a plurality of control checkpoints that the mobile communication terminal is located;
receive identifying information provided by a user of the mobile communication terminal at the identified control checkpoint; and
associate the identifier of the mobile communication terminal with the identifying information,
wherein each of the one or more local interrogation devices is configured to have a different location area code (LAC) from a LAC of a nearest cellular base station, and the global interrogation device instructs the mobile communication terminal to connect with the one or more local interrogation devices replacing the global interrogation device such that the one or more local interrogation devices act as an intermediate exchange of communication between the mobile communication terminal and the cellular base station.

8. The system of claim 7, wherein the processor is further configured to identify a location of the local interrogation device, and further wherein the identifying information was provided by the user at the identified location.

9. The system of claim 8, wherein the processor is further configured to:
cause the mobile communication terminal to transmit a location-ascertaining signal to each sensor of a plurality of sensors, wherein each sensor is located at a control point of the plurality of control points; and
based on a signal intensity of the location-ascertaining signal received by each sensor of the plurality of sensors, identify the control checkpoint of a plurality of control checkpoints that the mobile communication terminal is located.

10. The system of claim 9, wherein each local interrogation device of the one or more local interrogation devices is further configured to cause the mobile communication terminal to transmit, to the local interrogation device, a network measurement report (NMR) that indicates respective signal intensities of signals received from one or more of the local interrogation devices, and
wherein the processor is further configured to to identify the location of the control checkpoint of the plurality of control checkpoints, based on the signal intensities.

11. The system of claim 7, wherein the identifier includes at least one of: an International Mobile Subscriber Identity (IMSI), and an International Mobile Station Equipment Identity (IMEI).

12. The system of claim 7, wherein the processor is further configured to
determine a range of times when the user was located at a control point;
determine a time when the identifying information was provided; and
associate the identifier of the mobile communication terminal with the identifying information if the determined time is within the range of time.

13. The system of claim 7, wherein the identifying information comprises a scan of a passport, a license plate number, or an image of the user.

14. The system of claim 7, wherein the system is configured such that each of the local interrogation devices has a priority, within a hierarchical network, that is higher than a priority of the global interrogation device.

15. The system of claim 7, wherein the global interrogation device is further configured to cause the mobile communication terminal to reassociate with the particular one of the one or more local interrogation devices, by handing the mobile communication terminal over, from the global interrogation device, to the particular one of the local interrogation devices.

16. The system of claim 7, wherein the global interrogation device is configured to cause the mobile communication terminal to transmit, to the global interrogation device, a network measurement report (NMR) that indicates respective signal intensities of signals received from one or more of the local interrogation devices, and to hand the mobile communication terminal over to the particular one of the local interrogation devices in response to the respective signal intensities.

17. The system of claim 7, wherein the global interrogation device is further configured:
- to obtain at least one authentication vector issued by a Home Location Register (HLR) server that serves the cellular network, and
- to provide cellular service to the mobile communication terminal, subsequently to soliciting the mobile communication terminal, using an encryption key derived from the authentication vector.

18. The system of claim 7, wherein a location area code (LAC) of the global interrogation device is the same as a LAC of the cellular base station.

\* \* \* \* \*